United States Patent [19]
Hirota

[11] Patent Number: 5,291,294
[45] Date of Patent: Mar. 1, 1994

[54] CHARGE COUPLED DEVICE IMAGER WITH HORIZONTAL CHARGE TRANSFER SECTIONS IN AN IMAGING SECTION

[75] Inventor: Isao Hirota, Kanagawa, Japan

[73] Assignee: Sony Corporation, Japan

[21] Appl. No.: 829,320

[22] Filed: Feb. 3, 1992

Related U.S. Application Data

[62] Division of Ser. No. 583,969, Sep. 13, 1990, Pat. No. 5,182,648.

Foreign Application Priority Data

Sep. 14, 1989 [JP] Japan .................. 1-239503
Sep. 14, 1989 [JP] Japan .................. 1-239504
Sep. 14, 1989 [JP] Japan .................. 1-239505

[51] Int. Cl.$^5$ ............................ H04N 5/335
[52] U.S. Cl. .................. 348/316; 348/249; 348/250
[58] Field of Search ........ 358/213.11, 213.23, 358/213.26, 213.29, 213.28, 212; H04N 5/335

[56] References Cited

U.S. PATENT DOCUMENTS

| | | | |
|---|---|---|---|
| 4,280,141 | 7/1981 | McCann et al. | 358/213.26 |
| 4,322,752 | 3/1982 | Bixby | 358/213.27 |
| 4,811,105 | 3/1989 | Kinoshi et al. | 358/213.24 |

FOREIGN PATENT DOCUMENTS

| | | | |
|---|---|---|---|
| 61-93781 | 5/1986 | Japan | H04N 5/335 |
| 61-198981 | 9/1986 | Japan | H04N 5/335 |
| 62-42677 | 2/1987 | Japan | H04N 5/335 |
| 1-85483 | 3/1989 | Japan | H04N 5/335 |
| 1-91577 | 4/1989 | Japan | H04N 5/335 |

*Primary Examiner*—Michael T. Razavi
*Assistant Examiner*—Tuan V. Ho
*Attorney, Agent, or Firm*—Ronald P. Kananen

[57] ABSTRACT

A charge coupled device imager has an imaging section comprising a plurality of photoelectric converting sections and a plurality of horizontal charge transfer sections arranged in a matrix configuration divided into two sections. Each of the photoelectric converting sections is surrounded with a channel stop region for isolating each other and a readout gate region. Signal charges in the imaging section are transferred by the horizontal charge transfer sections in opposite horizontal directions according to the raster scanning direction of television signal, so that the horizontal charge transfer sections in an unit cell are not elongated in the vertical direction and transfer frequency is lowered. As a result of the horizontal transfer in the imaging section, the photoelectric converting sections can be arrayed with high density in horizontal direction to achieve high horizontal resolution.

3 Claims, 7 Drawing Sheets

CHARGE COUPLED DEVICE IMAGER WITH HORIZONTAL CHARGE TRANSFER SECTIONS IN AN IMAGING SECTION

This application is a division of application Ser. No. 07/583,969 filed Sep. 13, 1990 now U.S. Pat. No. 5,182,648.

BACKGROUND OF THE INVENTION

1. Field of the Invention

The present invention relates to improved charge coupled device imagers and, particularly, to a charge coupled device imager for high horizontal resolution.

2. Description of the Prior Art

Solid state imaging devices, such as CCD imagers, loaded in various cameras, are adapted for outputting image signals corresponding to the light from an object. The image or video signals, outputted from the solid state imaging devices, are usually output signals corresponding to the television signals.

Meanwhile, charge transfer of the CCD type solid state imaging devices is classed into three types, namely the interline transfer, frame interline transfer and frame transfer types.

FIG. 1 is a diagrammatic view of the customary interline transfer type CCD. A large number of photoelectric converting sections 101 are arranged in a matrix configuration and a vertical register section 102 is associated with each vertical column of the converting sections 101. Each of the vertical register sections 102 is electrically connected to a horizontal register section 103, by which signal charges are outputted via output section 104 for each horizontal line of a television raster.

As the frame transfer type CCD, there is known an imaging device described in the Japanese Patent Publications (KOKAI) 61-125077(1986) or 61-198891(1986). With a view to achieving interlaced scanning, signal charges are transferred i n the horizontal direction of the TV picture or raster in the imaging sections of these known imaging devices, despite the fact that these devices are of the frame transfer type.

The frame transfer type solid state imaging devices, in which the photoelectric converting sections play the role of transferring signal charges, are superior in such respect that an available light receiving area may be increased. However, satisfactory light absorption or sensitivity cannot be assured with such imaging devices, while it is difficult to reduce smearing. In addition, it is not necessary to output an interlaced signal from the CCD from a view of the progress of digital technology.

With the use of the frame interline transfer or interline transfer type CCD devices, in place of the fame transfer type devices, reduced smear and improved sensitivity may be realized. Above all, the smear may be reduced positively with the frame interline transfer CCDs.

However, with the TV signals of the NTSC system, vertical resolution is established monistically by the frequency of 60 Hz and the 525 lines. Hence, for improving the resolution, it is necessary to increase the number of the photoelectric converting sections in the horizontal direction, resulting in the reduced length of the horizontal side of the rectangular unit cell. On the other hand, since the aspect ratio of the TV signals is set to 4:3, the shape of the unit cell of the solid state imaging element of the frame interline transfer type CCD, for example, becomes more elongated in the vertical direction if the horizontal resolution is to be improved.

FIG. 2 shows the layout of the vertically elongated unit cell of the interline transfer type CCD. In each unit cell, a rectangular vertical register section 111 is formed having the vertical direction, i.e., a V-direction as the longitudinal direction and a read-out gate section 112 is formed for extending along the vertical register section 111. An opening 113 in a photo shield film, surrounded by a channel stop region 114, is formed on the photoelectric converting section adjacent to the read-out gate section 112. It is noted that, with improvement in the horizontal resolution, the size of the opening 113, the photoelectric converting section, or the vertical register section 111 becomes shorter in the horizontal or H-direction, while becoming more elongated in the vertical or V-direction.

In this manner, if the horizontal resolution of the interline transfer type CCD is to be improved, in the first place, the width in the H-direction of the vertical register section 111 is reduced, and its transfer efficiency is lowered. Second, the read-out gate section 112 or the channel stop region 114 is elongated in contour with resulting increase in the area in the unit cell As a result, opening 113 is reduced in the area and hence a sufficient sensitivity or a sufficient amount of handling charges cannot be obtained. Third, patterning of the opening 113 becomes more intricate in the H-direction, resulting in increased fabricating difficulties and fluctuations in sensitivity.

SUMMARY OF THE INVENTION

It is an object of the present invention to provide an improved charge coupled device imager in which each unit cell of an imaging section has a large photoelectric converting section to achieve sufficient sensitivity and fabricating easiness with high transfer efficiency and sufficient handling charges in spite of a high horizontal resolution.

It is another object of the present invention to provide a charge coupled device imager having a plurality of horizontal charge transfer sections which are driven by a low transfer frequency.

According to the present invention, there is provided a charge coupled device imager comprising an imaging section having a plurality of photoelectric converting sections and a plurality of horizontal charge transfer sections. Each of the horizontal charge transfer sections is abutted on the row of the photoelectric converting section. In a unit cell, the photoelectric converting section is surrounded with a channel stop region and a readout gate region. The readout gate region is placed between the photoelectric converting section and the horizontal charge transfer section.

To achieve high horizontal resolution, the unit cells are arrayed with high density in the horizontal direction. As the horizontal charge transfer section in the unit cell is not elongated in the vertical direction, the photoelectric converting sections are prevented from shrinking in the horizontal direction.

According to one embodiment of the invention, a charge coupled device imager includes a plurality of photoelectric converting sections, a plurality of horizontal charge transfer section abutted on the row of the photoelectric converting sections, are storage sections like in a frame interline transfer type CCD imager. Signal charges generated in the photoelectric converting sections are transferred from the horizontal charge transfer sections to the storage sections with high speed, so that smear is reduced. In one particular embodiment of the invention, the storage sections are provided at both ends of the horizontal charge transfer sections of the imaging section in the horizontal direction. The transfer frequency is lowered owing to the reduced number of the signal charges which should be transferred to the storage sections at one time.

In another particular embodiment of the invention, the storage section storage signal charges transiently and transfers the signal charge not only the horizontal direction also the vertical direction. The output signals from the charge device imager become more convenient for television signal processing.

BRIEF DESCRIPTION OF THE DRAWINGS

FIG. 12 is a schematic view of a tenth embodiment CCD imager of the present invention;

DESCRIPTION OF THE PREFERRED EMBODIMENTS

The present invention will be described in detail hereinunder in connection with embodiments.

FIRST EMBODIMENT

In the present embodiment, an interline transfer type CCD 1 is disclosed, in which the charge transfer direction from an imaging section thereof corresponds to the horizontal direction of the television picture surface.

Figure 3:
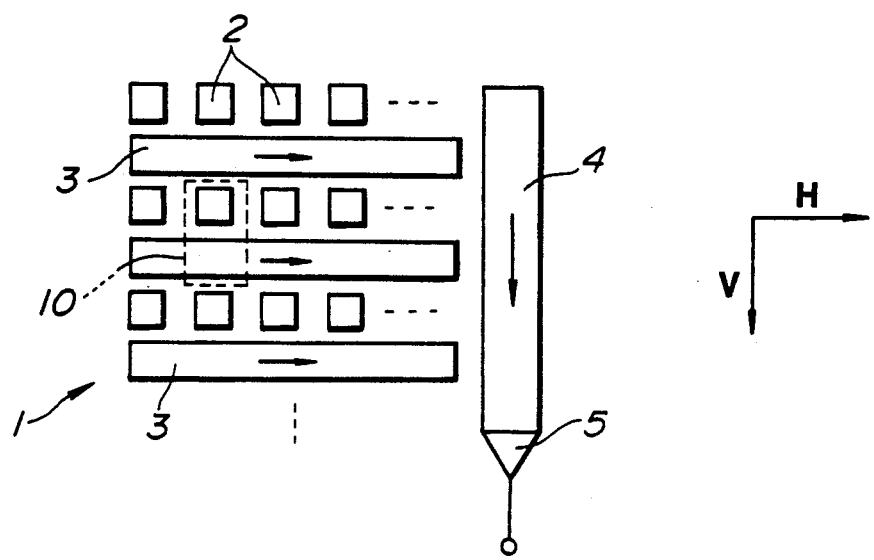
FIG. 3 is a schematic view of a first embodiment CCD imager of the present invention.

FIG. 3 shows the overall structure of the CCD 1 having a large number of photoelectric converting sections 2 arranged in a matrix configuration. These photoelectric converting sections 2 are electrically isolated from one another by channel stop regions. In the drawing, the horizontal direction corresponding to the scanning line direction of the television raster is indicated as the H-direction, while the direction normal thereto is the V-direction. The number of the photoelectric converting sections 2 in the v-direction is equal to the degree of vertical resolution which is 525 in the NTSC system, while the number of the sections 2 in the H-direction is equal to the degree of horizontal resolution. A horizontal charge transfer section 3 is formed for and along each horizontal row of the photoelectric converting sections 2. To these horizontal charge transfer sections 3 are supplied multi-phase driving signals, such as 4 phase driving signals, by means of which the charges are transferred. The charge transfer direction of the horizontal charge transfer sections 3 is the H-direction corresponding to the scanning line direction for the television picture surface or raster. Each photoelectric converting section 2 has a read-out gate section, not shown in FIG. 3, between it and the associated horizontal charge transfer section 3, and signal charges are read out by means of the read-out gate section from each converting section 2 to the horizontal charge transfer section 3. A vertical charge transfer section 4 is provided at the horizontal terminal ends of the horizontal charge transfer section 3. This vertical charge transfer section 4 is a register for transferring signal charges from the converting sections 2 on a column-by-column basis and is also supplies with proper drive signals. An output section 5 is provided at the vertical terminal end of the vertical charge transfer section 4 for sequentially outputting the transferred signals. Although only one vertical charge transfer section 4 is provided in the present embodiment, a plurality of vertical charge transfer sections may also be provided for reading out signal charges.

Figure 4:
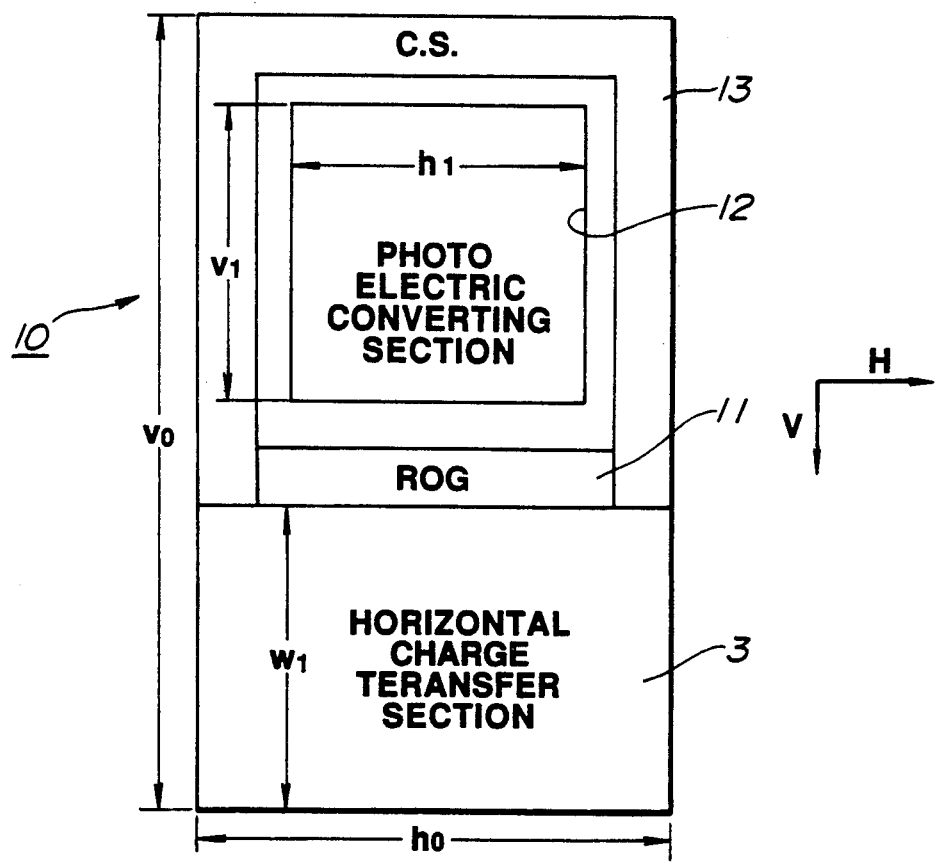
FIG. 4 is a schematic plan view of a unit cell of a preferred embodiment of the present invention.

In FIG. 3, an area indicated by a broken rectangle indicates the contour of a unit cell 10 which is shown to an enlarged scale in FIG. 4. As shown in FIG. 4, the unit cell 10 of the CCD of the present embodiment has a length equal to $h_0$ in the H-direction and a length equal to $v_0$ in the V-direction. For raising the horizontal resolution, the length $h_0$ is selected to be shorter than the length $v_0$ so that the unit cell 10 has the contour of a vertically elongated rectangle as shown. Each such unit cell 10 is constituted by a horizontal charge transfer section 3, an opening 12 associated with the photo-electric converting section 2, a channel stop region 13 and a readout gate region 11.

The horizontal charge transfer section 3 in each unit cell 10 is continuous to the horizontal charge transfer sections 3 of the adjacent unit cells 10, so that it has a length in the H-direction equal to the length $h_0$, while it has a width $w_1$ in the V-direction. With the unit cell 10, the H-direction corresponds to the direction of the shorter side of the cell 10, and the charge transfer sections may be formed along the shorter sides of the cells 10 in order that the sections may be formed continuously across the unit cells. Thus the width $w_1$ along the V-direction may be increased for the same area of the unit cell as compared to the CCD adapted for transferring the charges in the V-direction, as shown in FIG. 4, with the resulting improved transfer efficiency.

Figure 1:
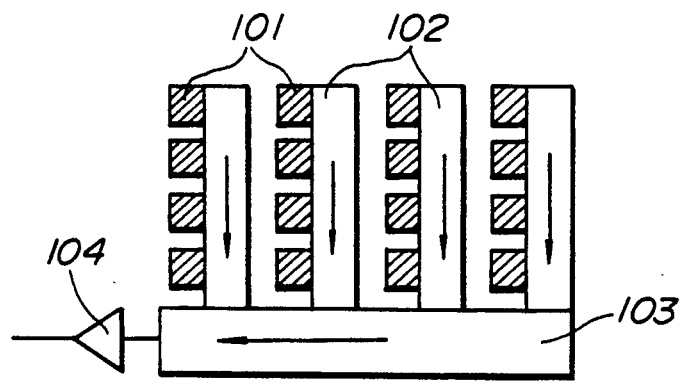
FIG. 1 is a schematic view of a prior art interline transfer type CD imager.
Figure 2:
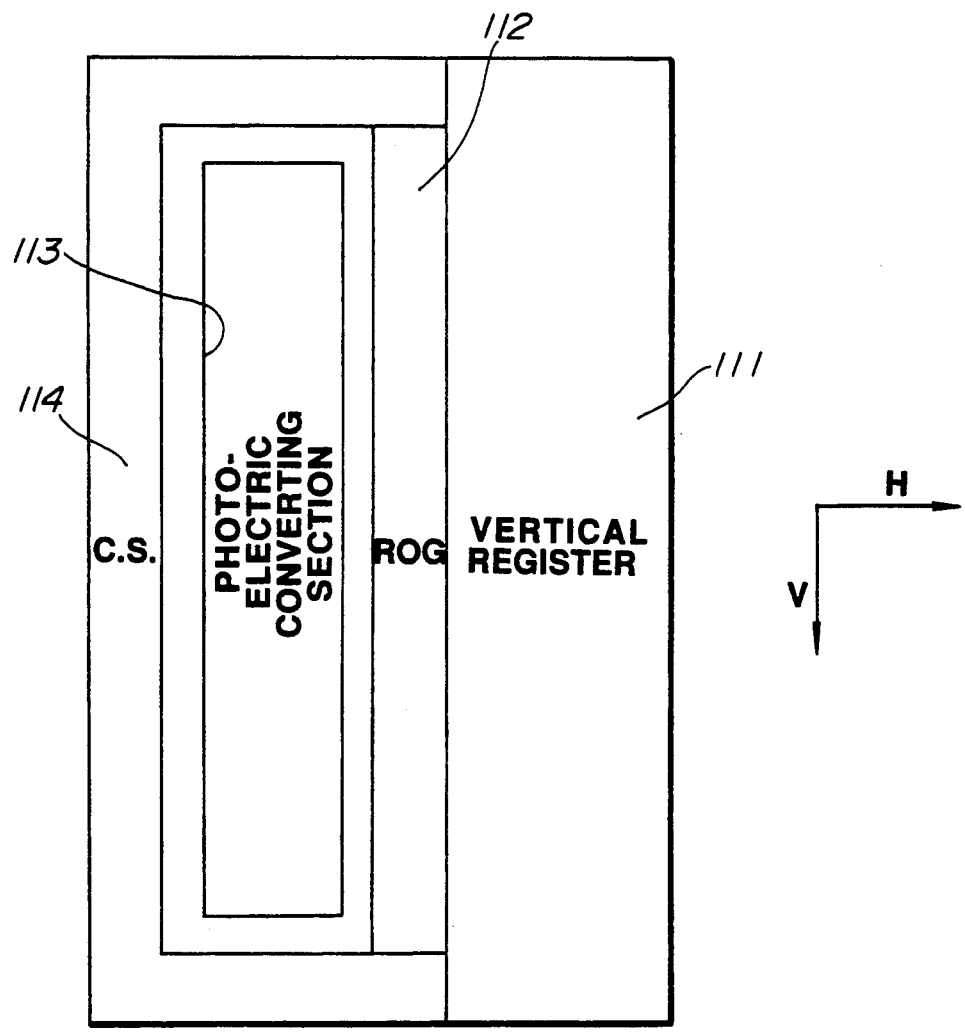
FIG. 2 is a schematic plan view of a unit cell of a prior art CCD imager.

The channel stop region 13 and the readout gate region 11 are provided for surrounding the associated photoelectric converting section 2 when seen in plan view. Within the unit cell 10 of the present embodiment, since the horizontal charge transfer section 3 occupies the lower part of the cell 10, it is unnecessary to form the channel stop region 13 or the read-out section 11 over the entire length of the longer side $v_0$ of the unit cell, but it is only necessary to form the region 13 or the region 11 over an extent of $v_0-W_1$ in the V-direction or along the longer side of the unit cell. Thus the area occupied by the channel stop region 13 or the read-out section 11 may be reduced sufficiently as compared to the conventional CCD shown in FIG. 2.

The opening 12 of the photoelectric converting section 2, which is a pattern formed in a light shield film, may be enlarged in area because the channel stop region 13 or the read-out section 11 is reduced in area, as described above. In addition, a opening 12 has the length $h_1$ in a H-direction and the length $v_1$ in the V-direction, wherein the lengths $h_1$ and $v_1$ are not different significantly from each other, so that the opening 12 is approximately square in shape and hence occupies an area which is relatively large compared to the perimetral length of the opening 12. Thus the amount of charges generated in the photoelectric section 2 may be increased to improve sensitivity. On the other hand, since the opening 12 is not elongated in contour, the lithographic manufacture process for the opening 12 may be facilitated while the unit cell 10 itself may be miniaturized more conveniently.

With the CCD of the present embodiment in which charges are transferred in the horizontal direction in the imaging region with the aid of such unit cell 10, outputs corresponding to the signal charges for each vertical column may be issued sequentially at the output section 5. It will be noted that, if the signals are stored, after digital signal processing, in a memory of a video RAM or the like, so as to be taken out subsequently, output signals corresponding to the TV signals may be produced.

SECOND TO FOURTH EMBODIMENTS

Figure 5:
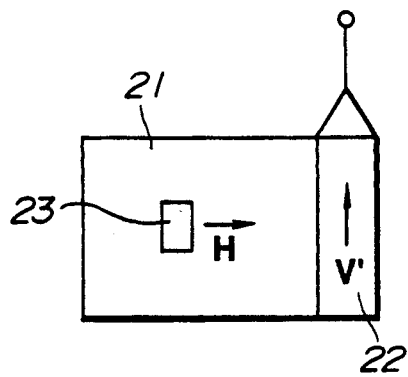
FIG. 5 is a schematic view of a second embodiment CCD imager of the present invention.

The CCDs of the second to fourth embodiments are modifications of the CCD of the first embodiment wherein, for example, the direction of charge transfer in the horizontal direction or in the vertical direction is changed from that of the first embodiment. In FIGS. 5 the H-direction is the forward direction of the scanning lines of the television raster, whereas the H'-direction is the reverse direction of the scanning lines. The V-direction and V'-direction are the vertical direction from above towards below and the vertical direction from below towards above, as seen in these figure, respectively.

Referring to FIG. 5, the CCD of the second embodiment has an imaging region 21 of the same structure as that of the CCD of the first embodiment, and a vertical charge transfer section 22 adjacent to the horizontal terminal end of the imaging region 21. Each unit 23 in the imaging region 21 is vertically elongated in contour, while the photoelectric converting section has an increased area, as shown in FIG. 4. Similarly to the first embodiment, the horizontal charge transfer section transfer signal charges in the H-direction, whereas the vertical charge transfer section 22 transfers signal charges in the V'-direction, that is, upwardly in FIG. 5. In this case, the output signals in each vertical line are issued in the reverse sequence from that of the CCD of the first embodiment.

Figure 6:
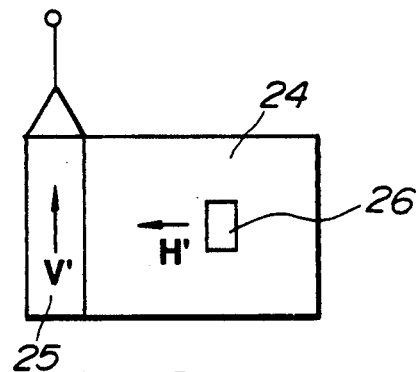
FIG. 6 is a schematic view of a third embodiment CCD image of the present invention.

The CCD of the third embodiment shown in FIG. 6 has an imaging region 24 formed by a large number of unit cells 26 of the same structure as that of the CCD of the first embodiment, and a vertical charge transfer section 25 is provided adjacent to the horizontal terminal end of the imaging region 24. The vertical charge transfer section 25 is provided at the side of the region 24 opposite to that with the CCD of the first and second embodiments, so that horizontal charge transfer proceeds in the reverse direction or in the H'-direction. The charge transfer direction in the vertical charge transfer section 25 is also the V'-direction, which is opposite to that of the first embodiment.

Figure 7:
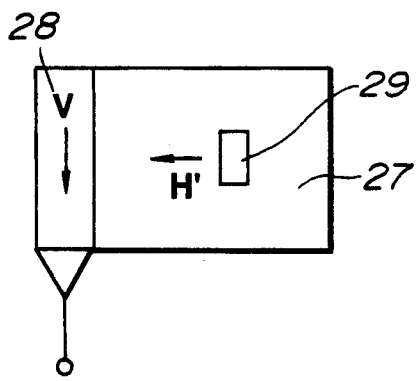
FIG. 7 is a schematic view of a fourth embodiment CCD imager of the present invention; embodiment CCD imager of the present invention.

The CCD of the fourth embodiment shown in FIG. 7 has an imaging region 27 formed by a large number of unit cells 29 of the same structure as that of the CCD of the first embodiment, and a vertical charge transfer section 28 is provided adjacent to the horizontal terminal end of the imaging region 27. This vertical charge transfer section 28 is provided at the same side as that with the CCD of the third embodiment, so that horizontal charge transfer proceeds in the H'-direction which is reversed from that with the CCD of the first embodiment. The charge transfer direction in the vertical charge transfer section 28 is the same V-direction as that with the CCD of the first embodiment.

FIFTH EMBODIMENT

The present embodiment is an example of a frame interline transfer type CCD 31 in which storage register sections are provided between a horizontal charge transfer section and a vertical charge transfer section.

Figure 8:
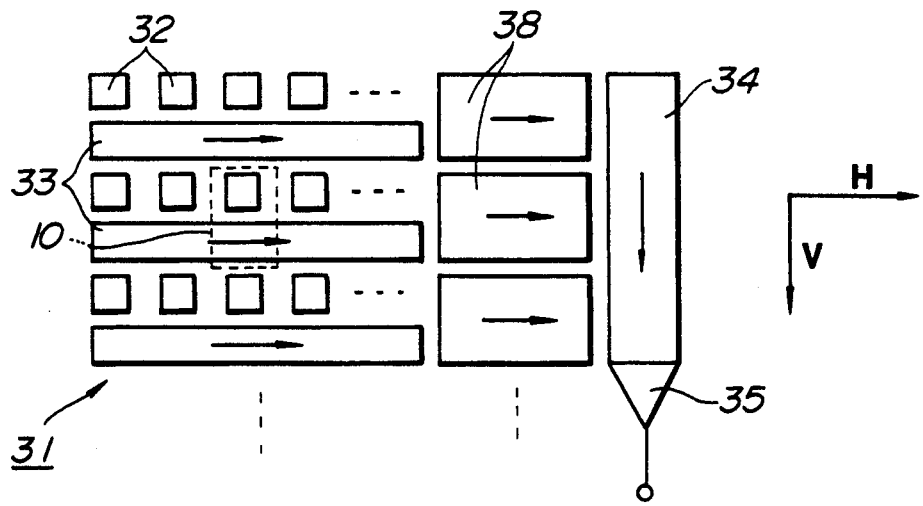
FIG. 8 is a schematic view of a fifth embodiment CCD imager of the present invention.

FIG. 8 shows an overall structure of the CCD in its entirety. Similarly to the CCD of the first embodiment, the CCD 31 has a large number of photoelectric converting sections 32 arranged in a matrix configuration and isolated from one another by channel stop regions. In the drawing, the horizontal direction corresponding to the raster scanning line direction is the H-direction and the direction normal thereto is the V-direction. The number of the photoelectric converting sections 32 corresponds to the degree of resolution. A horizontal charge transfer section 33 is formed along each horizontal row of the converting sections 32 with a read-out gate section interposed between it and the photoelectric converting section 32. The horizontal charge transfer sections 33 are supplied with proper drive signals, and the charge transfer direction in each transfer section 33 is the H-direction corresponding to the raster scanning line direction.

Storage register sections 38 are formed for each horizontal row at the horizontal terminal end of each horizontal charge transfer section 33. Each storage register section 38 is electrically connected to each associated horizontal charge transfer section 33 for transiently storing signal charges of each horizontal charge transfer section 33. The storage register section 38 is supplied with proper driving signals for realizing a high speed transfer and lowering signal smears. The charge transfer direction in the storage register section 38 is the horizontal direction. The storage charge sections 33 are electrically connected to a vertical charge transfer section 34.

This vertical charge transfer section 34 is a register for transferring signal charges from the storage register sections 38 on the column by-column basis. The transfer section 34 is supplied with proper driving signals for realizing the charge transfer. An output section 35 is provided at the vertical terminal end of the transfer section 34 for sequentially outputting the transferred signals. Although only one vertical charge transfer section 34 is provided in the present embodiment, a plurality of such vertical charge transfer sections may also be provided for reading out signal charges.

In FIG. 8, a region indicated by a broken line rectangle represents a unit cell 10 having a structure similar to that shown in FIG. 4. That is, the horizontal charge transfer section 33 is vertically elongated to improve its charge transfer efficiency. The channel stop region and the read-out section are reduced in size to increase the area of the opening corresponding to the photoelectric converting section 32 to improve sensitivity. The opening is substantially square in contour to help facilitate microfabrication.

With the CCD of the present embodiment, since the charges are transferred in the horizontal direction through the horizontal charge transfer sections between horizontal rows of the photoelectric converting sections 32 arranged in the matrix configuration, the layout of the unit cell 10 helps facilitate microfabrication. Signal smear may also be reduced because of the provision of the storage register sections 38.

SIXTH EMBODIMENT

The present embodiment is an example of a CCD in which charges are transferred in the imaging section in the horizontal direction which is the raster scanning direction and are stored transiently in a storage section and in which the signal charges thus stored in the storage section are transferred in the vertical direction.

Figure 9:
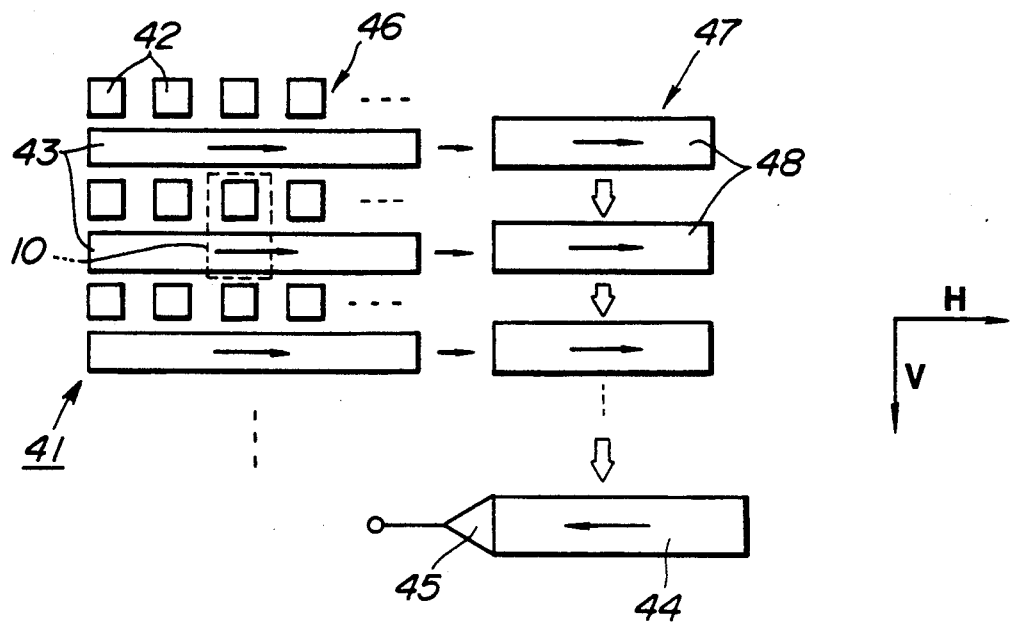
FIG. 9 is a schematic view of a sixth embodiment CCD imager of the present invention.

FIG. 9 shows an overall structure of the CCD in its entirety. Similarly to the CCD of the first embodiment, the CCD 41 has a large number of photoelectric converting sections 42 arranged in an imaging section 46 in a matrix configuration and isolated from one another by channel stop regions. In the drawing, the horizontal direction corresponding to the raster scanning line direction is the H-direction and the direction normal thereto is the V-direction. The number of the photoelectric converting sections 42 corresponds to the degree of resolution. A horizontal charge transfer section 43 is formed along each horizontal row of the converting sections 42 with a read-out gate section interposed between it and the photoelectric converting section 42. The horizontal charge transfer sections 43 are supplied with proper drive signals to effect charge transfer, and the charge transfer direction in each transfer section 43 is the H-direction corresponding to the raster scanning line direction.

A storage section 47 is formed adjacent to the imaging section 46 provided with the photoelectric converting sections 42 and the horizontal charge transfer sections 43. The storage section 47 is formed by storage register sections 48 each associated with one horizontal row. Each storage register section 48 is electrically connected with each horizontal charge transfer section 43 for transiently storing signal charges in each associated horizontal charge transfer section 43. A transfer gate is provided between adjacent storage register sections 48 of the storage section 47. Thus the charges are transferred in the H-direction from the horizontal charge transfer sections 43 to the storage register sections 48, from which the charges are transferred in the vertical direction to a horizontal CCD section 44. In this manner the charges are transferred in the horizontal direction so as to be transferred in the vertical direction in the storage section 47 to realize output signals corresponding to television signals while simultaneously realizing high sensitivity owing to the layout of the unit cell 10 as will be explained subsequently. Also the low signal smear may be realized by high speed transfer to the storage register section 48.

The horizontal CCD section 44 and the output section 45 read out signal charges on a line-byline basis. Thus the signal charges transiently stored in the storage section 47 are outputted on the line-byline basis. Meanwhile, plural horizontal CCD sections 44 may be provided for reducing the frequency of the transfer signals.

The region indicated by a broken line rectangle represents a unit cell 10 having a structure similar to that shown in FIG. 4. Thus the horizontal charge transfer section 43 is widened in the vertical direction to improve its transfer efficiency. On the other hand, the channel stop region and the read-out section are decreased in area to increase the area in the opening associated with the photoelectric converting section 42 to improve the sensitivity. In addition, the opening is substantially square in contour to facilitate microfabrication.

The CCD of the present embodiment has the merit due to the layout of the unit cell 10 and, since the transfer from the horizontal direction to the vertical direction is performed in the storage section 47, signal charges may be outputted in the sequence corresponding to the TV signal sequence. In addition, the CCD of the present embodiment may be applied to a system in which signals are not digitized subsequently.

SEVENTH TO NINTH EMBODIMENTS

Figure 10:
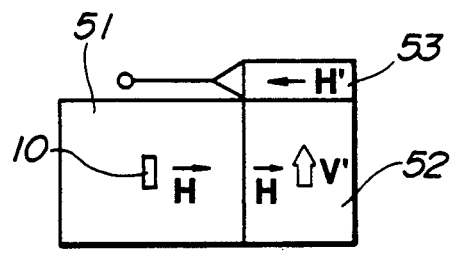
FIG. 10 is a schematic view of a seventh embodiment CCD imager of the present invention.
Figure 11:
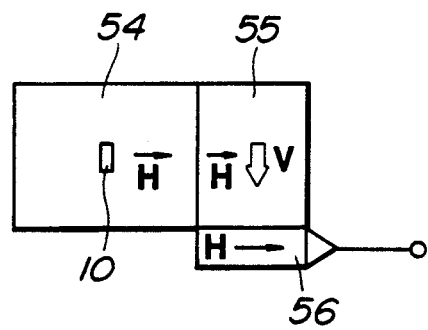
FIG. 11 is a schematic view of a eighth embodiment CCD imager of the present invention.
Figure 12:
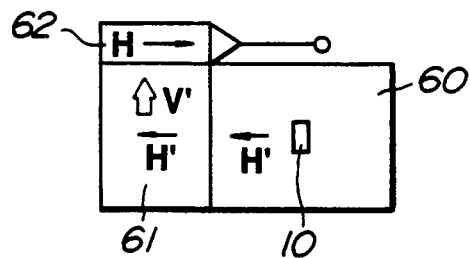
FIG. 12 is a schematic view of a ninth embodiment CCD imager of the present invention.

The seventh to ninth embodiments represent modifications of the sixth embodiment with different modes of transferring the charges. In FIGS. 10 to 12, the H-direction represents the forward direction of the raster scanning line direction and the H'-direction the direction reversed from the scanning line direction. The V-direction represents the vertical direction from above towards below and the V'-direction the vertical direction from below towards above.

The CCD of the seventh embodiment shown in FIG. 10 includes an imaging section 51 formed by a large number of unit cells 10 and having the horizontal direction as the charge transfer direction, a storage section 52 for vertically transferring charges which have been transferred horizontally, and a horizontal CCD section for signal reading. The charge transfer direction from the imaging section 51 to the storage section 52 is the H-direction which is the same direction as that in CCD of the sixth embodiment, whereas the charge transfer direction from the storage section 52 to the horizontal CCD section 53 is the V'-direction which is the direction towards above in the drawing. In the horizontal CCD section 53, charges are transferred in the H'-direction so as to be outputted at the output terminal.

With the CCD of the eighth embodiment, shown in FIG. 11, charge transfer in the H-direction from the imaging section 54 to the storage section 55 as well as charge transfer in the V-direction from the storage section 55 to the horizontal CCD section 56 proceeds in the same manner as with the CCD of the sixth embodiment. However, the charge transfer direction in the horizontal CCD section 56 is the H-direction which is opposite to that with the sixth embodiment. With the CCD of the present eighth embodiment, since charges are transferred in the horizontal direction in the imaging section 54, the unit cell 10 has a high sensitivity and superior transfer efficiency and lithographing accuracy.

With the CCD of the ninth embodiment, shown in FIG. 12, horizontal charge transfer from the imaging section 60 to the storage section 61 proceeds in the H'-direction, while vertical charge transfer from the storage section 61 to the horizontal CCD section 62 proceeds in the V'-direction and charge transfer in the horizontal CCD section 62 proceeds in the H-direction.

The modifications according to the seventh to tenth embodiments may be employed as the occasion may require.

TENTH EMBODIMENT

The CCD of the present embodiment is of the frame interline transfer type in which the charge transfer direction from the imaging region is the horizontal direction of the television raster and charges are read in two directions, that is in a direction towards left and in a direction towards right.

Figure 13:
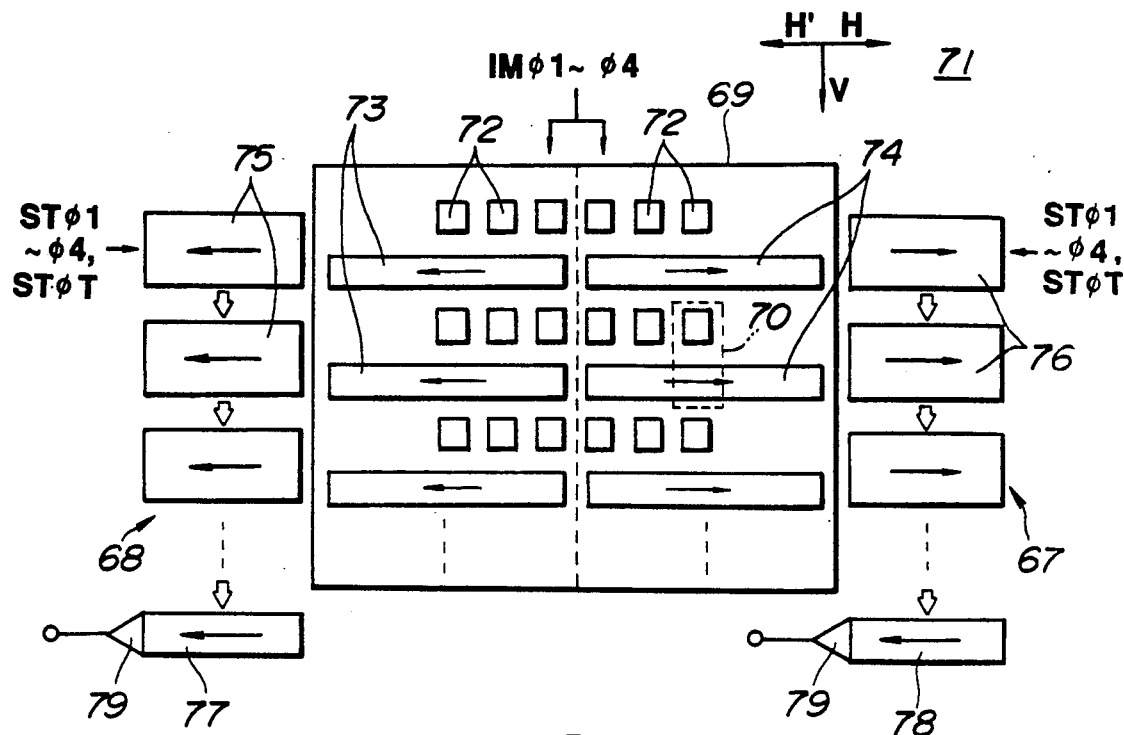

FIG. 13 shows the overall structure of the CCD 71 having a large number of photoelectric converting sections 72 arranged in a matrix configuration. These photoelectric converting sections 72 are electrically isolated from one another by channel stop regions. In the drawing, the horizontal direction corresponding to the direction of the raster scanning lines is the H-direction and the direction normal thereto is the V-direction. The number of the photoelectric converting sections 72 in the V-direction is equal to the degree of vertical resolution which is 525 in the NTSC system while the number of the sections in the H-direction is equal to the degree of horizontal resolution.

A first horizontal charge transfer section 73 and a second horizontal charge transfer section 74 are formed along and for each horizontal row of these photoelectric converting sections 72. Between the first charge transfer section 73 and the second charge transfer section 74 on one hand and the photoelectric converting section 72 on the other, there is provided a read-out gate section, not shown. It is by way of this read-out gate section that the charges in each of the photoelectric converting sections 72 are transferred to the first and second horizontal charge transfer sections 73 and 74. The first horizontal charge transfer sections 73 are arrayed in the left half of the imaging section 69 while the second horizontal charge transfer sections 74 are arrayed in the right half of the imaging section 69. Thus the charges in the left half photoelectric converting sections of each horizontal row are transferred by the first horizontal charge transfer section 73, whereas those in the right half photoelectric converting sections of the same horizontal row are transferred by the second horizontal charge transfer section 74. The charge transfer direction through the first horizontal charge transfer section 73 is the horizontal direction corresponding to the raster scanning line direction and is the H'-direction from the center of the imaging section 69 towards left in the drawing. On the other hand, the charge transfer direction through the second horizontal charge transfer section 74 is the horizontal direction corresponding to the raster scanning line direction and is the H-direction from the center of the imaging section 6911 towards right in the drawing. The charge transfer direction in the second horizontal charge transfer section 74 is opposite to that in the first horizontal charge transfer section 73. The first and second horizontal charge transfer sections 73 and 74 are supplied with 74 phase driving signals IM$\phi$1 to IM$\phi$4 so that charges are transferred in accordance with these signals. While the first horizontal charge transfer section 73 and the second horizontal charge transfer section 74 transfer charges in the mutually opposite directions, the same driving signals IM$\phi$1 to IM$\phi$4 may be used by reversing the relative positions of the storage and transfer sections.

A first storage section 68 is provided at the terminal ends of the first horizontal charge transfer sections 73. This first storage section 68 is formed by a plurality of first storage register sections 75 each of which is associated with one of the horizontal rows of the photoelectric converting sections and electrically connected to one of the first charge transfer sections 73 associated with the horizontal rows. In these first storage register sections 75, charges are transferred in the H'-direction and stored transiently therein so as to be transferred subsequently in the vertical or V-direction. The first storage section 68 is supplied with drive signals ST$\phi$1 to ST$\phi$4 for transferring the charges in the horizontal direction. Transfer gates are provided between the adjacent first storage register sections 75 and, for driving these transfer gates, the first storage section 68 is also supplied with drive signals ST$\phi$T.

A second storage section 67 is provided at the terminal ends of the second horizontal charge transfer section 74, as at the side of the first horizontal charge transfer section 73. This second storage section 67 is constituted by a plurality of second storage register sections 76 each of which is associated with one of the horizontal rows of the photoelectric converting sections and electrically connected to one of the second horizontal charge transfer sections 74 associated with the horizontal rows. In the second storage register sections 76, signal charges are transferred in the H-direction and transiently stored therein so as to be transferred subsequently in the vertical direction or in the V-direction. Similarly to the first storage section 68, the second storage section 67 is supplied with drive signals ST$\phi$1 to ST$\phi$4 for transferring the charges in the horizontal direction. Transfer gates are provided between the adjacent first storage register section 75 and, for driving these transfer gates, the second storage section 67 is also supplied with drive signals ST$\phi$T.

The charges from the first storage section 68 are transferred to first horizontal CCD section 77 as parallel data, while the charges from the second storage section 67 are transferred to second horizontal CCD section 78 as parallel data. These first and second horizontal CCD sections 77, 78 are supplied with proper driving signals to effect charge transfer in the H'-direction. Output sections 79, 79 are annexed to the vertical terminal ends of the first and second horizontal CCD sections 77, 78 for sequentially outputting the signal charges transferred thereto by the CCD sections 77, 78.

Although one each of the first and second horizontal CCD sections 77, 78 are provided in the present embodiment, a plurality of charge transfer sections may be provided for reading the signal charges. The charge transfer directions through the first and second horizontal CCD sections may also be reversed from those shown in FIG. 13, while the horizontal CCD sections may also be provided above the storage sections instead of below the storage sections.

The region indicated by a broken line rectangle in FIG. 13 represents a unit cell 70 having a structure similar to that shown in FIG. 4. Thus the horizontal charge transfer section 73 is widened in the vertical direction to improve its transfer efficiency. On the other hand, the channel stop region and the read-out section are decreased in area to increase the area in the opening associated with the photoelectric converting section 72 to improve the sensitivity. In addition, the opening is substantially square in contour to facilitate microfabrication.

A typical operation of the CCD of the present embodiment will be hereinafter explained.

First, during the imaging period other than the vertical blanking period of the television signals, the light from an object falls via opening of the unit cell 70 so as to be converted into signal charges at the photoelectric converting sections 72. Then, during the vertical blanking period, these signal charges are transferred from the converting sections 72 to the first and second horizontal charge transfer sections 73 and 74 by way of the read-out gates. The charges are transferred at high speed through the first and second charge transfer sections 73 and 74 in the horizontal direction. In the first horizontal charge transfer section 73, the signal charges are transferred in the H'-direction as far as the first storage register section 75. In the second horizontal charge transfer section 74, signal charges are transferred in the opposite direction to that in the first signal transfer section 73, or in the H-direction, as far as the second storage section 76. Should the signal charges be transferred in one horizontal direction through the rows of the unit cells, the transfer frequency would be increased. However, by transferring the charges in this manner in two horizontal directions, the number of the unit cells taking part in charge transfer in each direction and hence the transfer frequency may be halved. This results in the increased horizontal transfer efficiency and the sufficient quantity of the charges to be processed.

During the imaging period of the next field, charges transferred through the first and second storage sections 68, 67 are transferred to the storage register sections 75, 76 and thence to the horizontal CCD sections 77, 78 when then operate to read out the half-line data sequentially via output sections 79. The outputs are ultimately taken out sequentially in the horizontal direction to produce outputs corresponding to television signals.

With the CCD of the present embodiment, the special layout of the unit cell 70 results in improved sensitivity and transfer efficiency and helps facilitate microfabrication. The horizontal charge transfer in two directions results in the lowered transfer frequency to improve the transfer efficiency and the quantity of charges processed by the CCD as well as to relieve the load of the driver supplying drive signals.

ELEVENTH EMBODIMENT

In the present embodiment, a frame interline transfer type CCD 81 is disclosed, in which the charge transfer direction from an imaging section is the horizontal direction of the television picture surface or raster and the charge transfer direction is charged in the storage section from the horizontal direction to the vertical direction. The present embodiment represents another modification of the sixth embodiment with different mode of transferring the charges.

Figure 14:
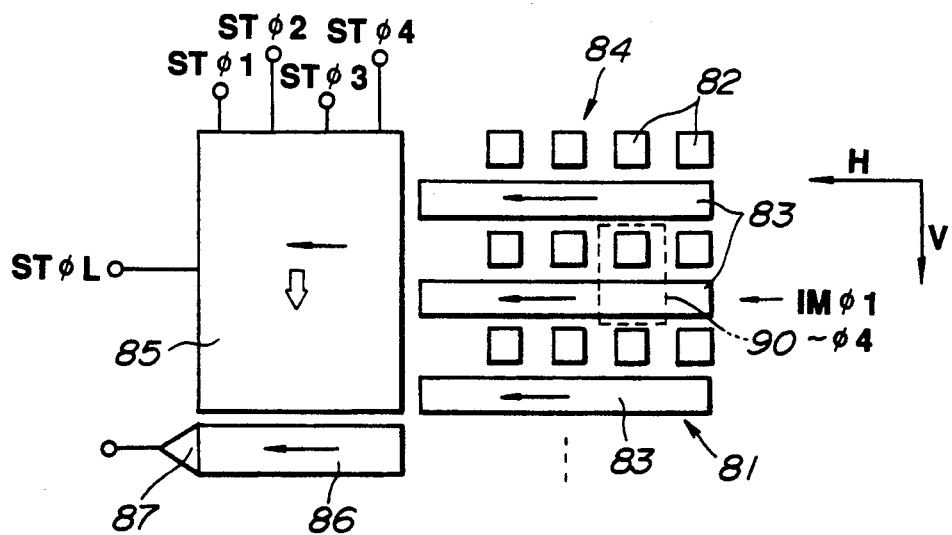
FIG. 14 is a schematic view of eleventh embodiment CCD imager of the present invention.

FIG. 14 shows an overall structure of the CCD 81, the imaging section 84 of which has a large number of photoelectric converting sections 82 arranged in a matrix configuration. These photoelectric converting sections 82 are electrically isolated from one another by channel stop regions. In the drawing, the horizontal direction corresponding to the scanning line direction of the television screen surface or raster is indicated as the H-direction, while the direction normal thereto is the V-direction. The number of the photoelectric converting sections 82 in the V-direction is equal to the degree of vertical resolution which is 525 in the NTSC system, while the number of the sections 82 in the H-direction is equal to the degree of horizontal resolution. A horizontal charge transfer section 83 is formed along and for each horizontal row of the photoelectric converting sections 82. To these horizontal charge transfer sections 83 are supplied 4-phase driving signals IM$\phi$1 to IM$\phi$4 by means of which the charges are transferred. The charge transfer direction of the horizontal charge transfer sections 83 is the H-direction corresponding to the scanning line direction for the television picture surface or raster. Each horizontal charge transfer section 83 has a readout section, not shown in FIG. 14, between it and the associated photoelectric converting section 82, and signal charges are read out by means of the read-out section from each photoelectric converting section 82 to the horizontal charge transfer section 83.

A storage section 85 is provided at the terminal ends of the horizontal charge transfer sections 83 for transferring charges from the horizontal charge transfer sections 83 in the H-direction for transiently storing the charges and subsequently transferring the stored charges in the vertical direction or V-direction. The storage section 85 is provided with 4-phase transfer electrodes and vertical transfer gates, as will be explained subsequently, and is supplied with driving signals ST$\phi$1 to ST$\phi$4 and ST$\phi$L.

At the vertical terminal end of the storage section 85 is arranged a horizontal CCD section 86, which is a register whereby the charges transferred from the storage section 85 in the V-direction may be sequentially transferred line by line in the H-direction. This horizontal CCD section 86 is also supplied with proper driving signals. At the horizontal terminal end of the horizontal CCD section 86 is formed an output section 87 by means of which the transferred signals are outputted sequentially. Although only one horizontal CCD section 86 is provided in the present embodiment, a plurality of horizontal CCD sections 86 may also be provided for reading out the signals.

The region indicated by a broken line rectangle represents a unit cell 90 having a structure similar to that shown in FIG. 4. Thus the horizontal charge transfer section 83 is widened in the vertical direction to improve its transfer efficiency. On the other hand, the channel stop region and the read-out section are decreased in area to increase the area in the opening associated with the photoelectric converting section 83 to improve the sensitivity. In addition, the opening is substantially square in contour to facilitate microfabrication. The arrangement of the storage section 85 for vertically transferring the horizontally transferred charged will be explained by referring to FIG. 15.

In the storage section 85, transfer electrode 91 to 94 are formed on the semiconductor substrate using a second electrode layer, such as a polysilicon layer, and a third electrode layer. These transfer electrodes 91 to 94 are each of a band-shaped pattern, with the V-direction as the longitudinal direction, and are overlapped at the ends or edges in the H-direction. The drive signals ST$\phi$1 to ST$\phi$4 are supplied to the transfer electrodes 91 to 94, respectively. Vertical transfer gates 95, each of a band-shaped pattern, with the H-direction as the longitudinal direction, are arranged orthogonally with respect to the transfer electrode 91 to 94. These vertical transfer gates 95 are provided at the positions lying between the horizontal rows of the imaging section 84 so that the regions between the vertical transfer gates 95 function as the register corresponding to the horizontal charge transfer sections 83. These vertical transfer gates 95 are formed with the use of the first electrode layer and are supplied with the drive signal $ST\phi L$ as the gate voltage. Below the vertical transfer gates 95 are formed by channel stop regions 96 in a discrete or interrupted pattern.

These channel stop regions 96 are comprised of discrete substantially regular parallelepipedic patterns lying along the longitudinal direction and along the horizontal direction. A transfer path 97 is formed between the region of the transfer electrodes 91, 92 above the associated vertical transfer gate 95 and the region of the transfer electrode 93, 94 below the same vertical transfer gate 95 as viewed in the drawing. Owing to the above mentioned pattern of the channel stop region 96, it becomes possible to inhibit charge transfer across the lower sides, as viewed in the direction passing through the drawing sheet from above, of the transfer electrodes 91 to 94 having different locations in the V-direction and supplied with the same-phase drive signals. This channel stop region 96 may be formed by implanting p-type impurities to a higher concentration on a semiconductor substrate. An oxide film or the like may be formed simultaneously. Although the storage section 85 of the CCD of the present embodiment is adapted to be driven by 4 phase driving signals, it may also be driven by 2 or 3 phase driving signals. The transfer electrodes may also be a pattern different from the band-shaped pattern.

A typical operation of the CCD of the present embodiment will be hereinafter explained.

During the imaging period, other than the vertical blanking period, of the TV signals, the light from an object will fall via openings of the unit cells 90 so as to be converted into signal charges at the photoelectric converting sections 82. Then, during the vertical blanking period, the signal charges are read unanimously from the converting sections 82 into the horizontal transfer sections 83 via read-out gates (ROG). The driving signals $IM\phi1$ to $IM\phi4$ are then supplied to the horizontal charge transfer sections 83 as high-speed clock signals, at the same time that the drive signals $ST\phi1$ to $ST\phi4$ are supplied to the transfer electrodes 91 to 94 of the storage section 85 as high-speed clock signals By means of these drive signals $IM\phi1$ to $IM\phi4$ and $ST\phi1$ to $ST\phi4$, charge transfer in the H-direction proceeds at a high speed in the horizontal charge transfer sections 83 so that the charges are transferred continuously at high speed to the lower regions of the transfer electrodes 91 to 94 of the storage section 85.

Figure 15:
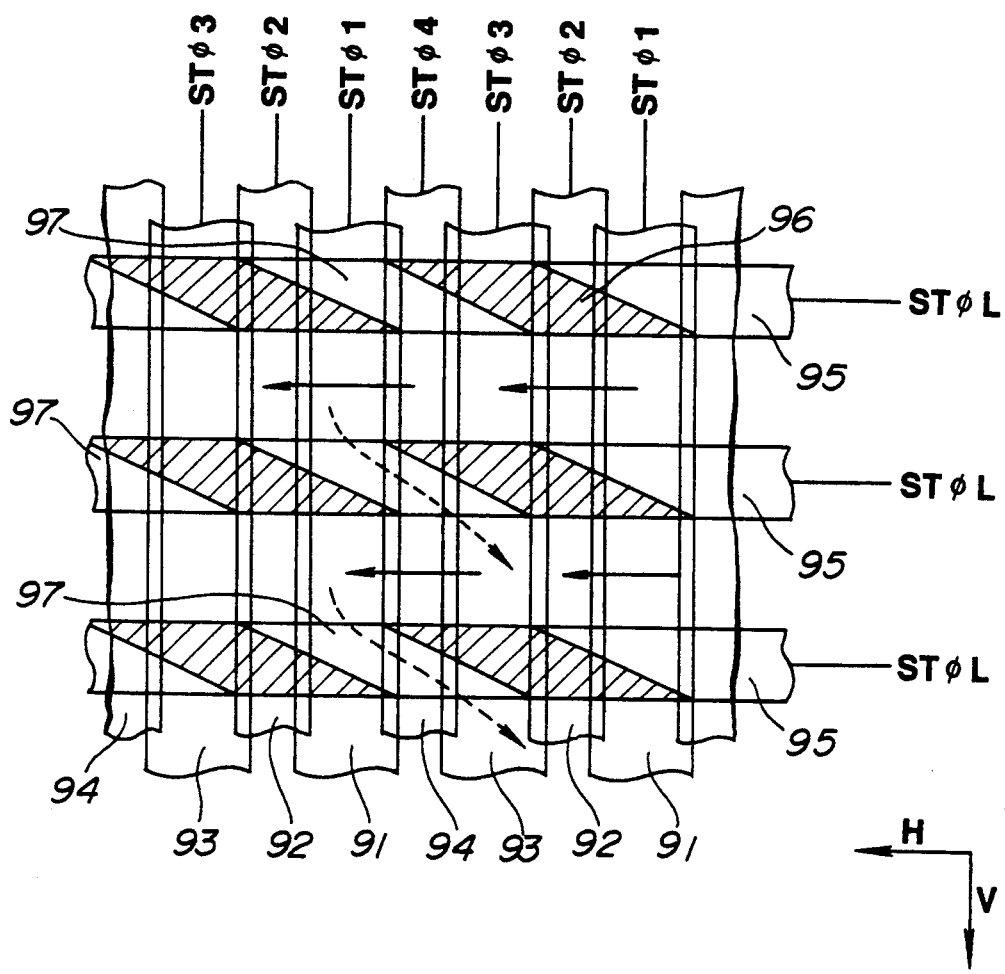
FIG. 15 is a plan view showing schematically a main portion of eleventh embodiment CCD imager of the present invention.
Figure 16:
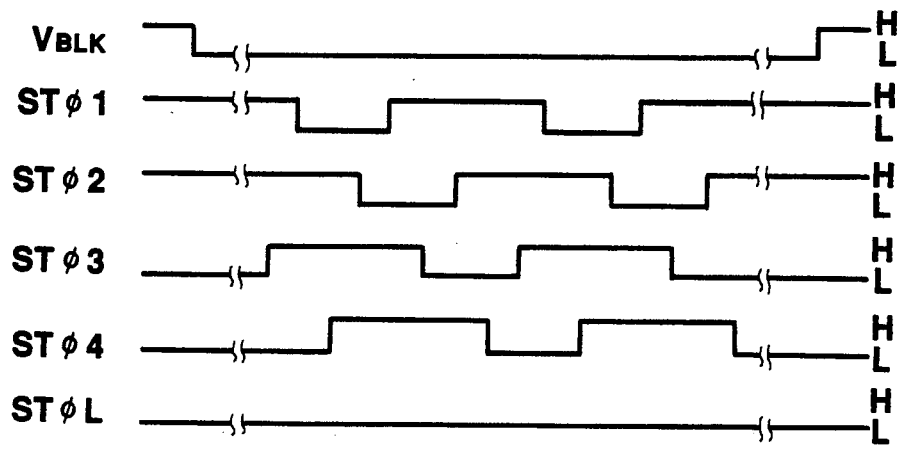
FIGS. 16 and 17 are schematic views depicting voltage waveforms applied to the CCD imager according to eleventh embodiment.

During horizontal charge transfer in the storage section 85, the signal $ST\phi L$ supplied to the vertical transfer gate 95 is at a low or "L" level. FIG. 16 is the signal timing chart in the storage section during the signal charge transfer in the horizontal direction. As shown in FIG. 16, during the vertical blanking period, a signal $V_{BLK}$ is at the "L" level. During this time, the driving signals $ST\phi1$ to $ST\phi4$ supplied to the transfer electrodes 91 to 94 are turned on or off repeatedly in a regular manner. More specifically, a little later than the time when the drive signal $ST\phi1$ goes to a high or "H" level, the drive signal $ST\phi2$ rises to a "H" level, from its "L" level. While the drive signal $ST\phi2$ remains at the "H" level, the drive signal $ST\phi3$ rises to the "H" level, from the "L" level, the drive signal $ST\phi1$ falling to the "L" level. Thus the potential well becomes deep initially at the transfer electrode 91, then becoming deep at the transfer electrodes 92 and 93 in this order. Hence, with changes in the potential of the transfer electrodes, signal charges are transferred in the solid line direction shown in FIG. 15. The drive signal $ST\phi4$ then rises while the drive signal $ST\phi2$ falls, and then the drive signal $ST\phi1$ rises while the drive signal $ST\phi4$ falls, to complete one cycle period. This cycle is then repeated to perform charge transfer in the horizontal direction. During this time, the signal $ST\phi L$ supplied to the vertical transfer gate 95 is at the "L" level to inhibit charge transfer in the V-direction so that the charge transfer proceeds only in the horizontal direction. After such transfer is terminated, signal charges for one unit cell 90 are stored by a unit of the transfer electrodes 91 to 94 at the storage section 85.

Figure 17:
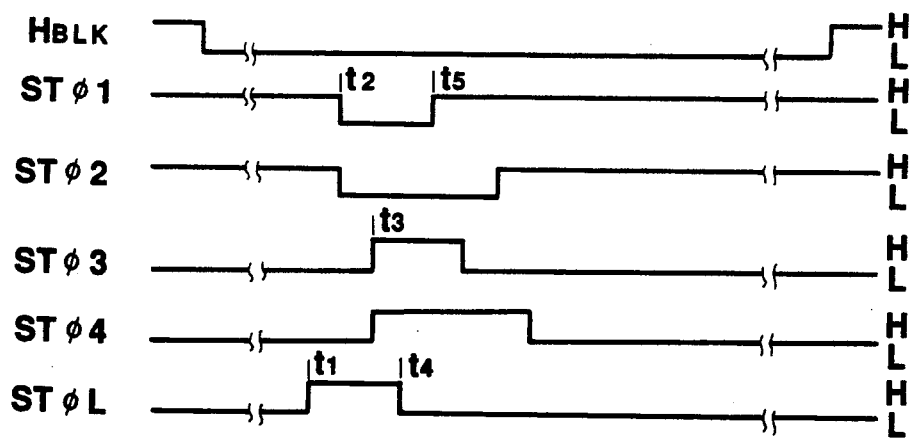

After the end of the vertical blanking period, the charges stored in the storage section 85 are transferred during the next field period with line-byline shift transfer in the V-direction. Referring to FIG. 17, illustrating such line-byline shift transfer operation, the line-byline shift transfer occurs during the horizontal blanking period. In FIG. 17, the horizontal blanking period is the period when the signal $H_{BLK}$ is at the "L" level. It is assumed that initially the device signals $ST\phi1$ and $ST\phi2$ are at the "H" level, while the drive signals $ST\phi3$ and $ST\phi4$ are at the "L" level, and the signal charges are stored in the potential well at the lower regions of the transfer electrodes 91, 92. Then, at time $t_1$, the signal $ST\phi L$ rises from the "L" level to the "H" level, the vertical transfer gate 95 being in the conducting or charge transferring state. Thus the signal charges are transferred from the lower regions of the transfer electrodes 91, 92 to the transfer channel 97 below the transfer gate 95. Then, at time $t_2$ the drive signals $ST\phi1$, $ST\phi2$ are at the "L" level and the signal charges become concentrated at the transfer channel 97. Then, at time $t_3$, the drive signals $ST\phi3$, $ST\phi4$ go to "H" level and signal charges are partially transferred from the transfer channel 97 to the transfer electrodes 93, 94. Then, at time $t_4$, the signal $ST\phi L$ falls to the "L" level from the "H" level, the vertical transfer gate 95 is interrupted and signal charges are completely transferred to the potential wells of the transfer, electrodes 93, 94. With the clocks produced since time $t_5$, signal charges are transferred from the potential well of the transfer electrodes 93, 94 to the potential well of the transfer electrodes 91, 92 to complete one-line shifting. In FIG. 15, the broken line arrow indicates the transfer route along the V-direction and transfer proceeds via the transfer channel 97.

Such line-byline shift transfer proceeds during the horizontal blanking period. During one horizontal period between the horizontal blanking periods, the horizontal CCD section 86 and the output section 87 are in operation to read out signal charges line by line so as to be inputted to other signal processing circuits, not shown as the CCD outputs.

With the above described layout of the unit cell 90 of the CCD of the present embodiment, higher sensitivity and transfer efficiency may be achieved, while more microfabrication may be realized easily. By virtue of the arrangement of the storage section 85, more reliable horizontal and vertical charge transfer may be achieved to provide output signals more convenient for television signal processing.

Although the signal charges are transferred in the horizontal direction in the imaging section 84, storage section 85 and in the horizontal CCD section 86 and in the vertical direction in the storage section 85, the signal charge transfer direction may be reversed in these sections from those described in the present embodiment.

What is claimed is:

1. A charge coupled device imager comprising:

a semiconductor substrate having a surface area, an imaging section formed in the surface area of the substrate including:

a plurality of photoelectric converting sections for generating signal charges, each of said plurality of photoelectric converting sections being isolated from each other and being arrayed in a matrix configuration, said matrix configuration being vertically separated into a first portion and a second portion and having at least horizontal rows, a plurality of readout gate regions, each respectively abutting a side of each of the plurality of photoelectric converting sections for transferring the generated signal charges, a plurality of first horizontal charge transfer sections provided in the first portion of the imaging section and provided between the horizontal rows of the photoelectric converting sections, for transferring the signal charges via the readout gate regions of the first portion of the imaging section in one horizontal direction in response to a raster scanning direction of a television signal, wherein each of the charge transfer sections transfers the signal charges of each of a corresponding plurality of rows of photoelectric connection sections in the first portion of the imaging section, a plurality of second horizontal charge transfer sections provided in the second portion of the imaging section and provided between the horizontal rows of photoelectric converting sections, for transferring the generated signal charges via the readout gate regions of the second portion of the imaging section in a second horizontal direction opposite to the horizontal direction of the first horizontal charge transfer section, wherein each of the second charge transfer sections transfers the signal charges of each of a corresponding plurality of rows of photoelectric converting sections in the second portion of the imaging section; and output means, including readout means for reading out image signals from the signal charges generated and transferred from the imaging section.

2. A charge coupled device imager according to claim 1, further comprising a first plurality of storage sections for storing signal charges from the first horizontal charge transfer sections and a second plurality of storage sections for storing signal charges from the second horizontal charge transfer sections.

3. A charge coupled device imager according to claim 3, wherein the transferring signal charges from the imaging section to the first plurality of storage sections and the transferring signal charges from the imaging section to the second plurality of storage sections are operated simultaneously.

* * * * *